United States Patent
Bravery et al.

(10) Patent No.: US 8,140,952 B2
(45) Date of Patent: Mar. 20, 2012

(54) METHOD OF ASSISTING A USER

(75) Inventors: Andrew J. F. Bravery, Salisbury (GB); Martin J. Gale, Eastleigh (GB); Roland A. Merrick, Nr. Evesham (GB); Andrew J. Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 10/976,262

(22) Filed: Oct. 28, 2004

(65) Prior Publication Data

US 2005/0138539 A1 Jun. 23, 2005

(30) Foreign Application Priority Data

Dec. 18, 2003 (GB) .................. 0329262.0

(51) Int. Cl.
*G06F 17/21* (2006.01)
(52) U.S. Cl. ............................................. 715/200
(58) Field of Classification Search .......... 715/505, 715/507, 221–227, 200; 709/227
See application file for complete search history.

(56) References Cited

U.S. PATENT DOCUMENTS

| | | | |
|---|---|---|---|
| 6,490,601 B1* | 12/2002 | Markus et al. | 715/507 |
| 6,615,226 B1* | 9/2003 | Hartman et al. | 715/505 |
| 6,779,042 B1* | 8/2004 | Kloba et al. | 709/248 |
| 2002/0023108 A1* | 2/2002 | Daswani et al. | 707/507 |
| 2004/0083426 A1* | 4/2004 | Sahu | 715/505 |
| 2004/0205530 A1* | 10/2004 | Borg | 715/507 |
| 2005/0091577 A1* | 4/2005 | Torres et al. | 715/507 |
| 2005/0149854 A1* | 7/2005 | Pennell et al. | 715/507 |
| 2005/0174605 A1* | 8/2005 | Silverbrook et al. | 358/1.18 |
| 2005/0198212 A1* | 9/2005 | Zilberfayn et al. | 709/219 |
| 2006/0200754 A1* | 9/2006 | Kablesh et al. | 715/505 |

FOREIGN PATENT DOCUMENTS

| | | |
|---|---|---|
| WO | 0207087 A2 | 1/2002 |
| WO | 03021476 A1 | 3/2003 |

OTHER PUBLICATIONS

Bauer, German, "Automatic Form Fill", Jan. 25, 2001, available: http://www.mozilla.org/projects/ui/communicator/browser/formfill.*

Halasz, Steven, "An Improved Method for Creating Dynamic Web Forms using APL", 2001 ACM 1-58113-182-8, pp. 104-111.*

* cited by examiner

*Primary Examiner* — Doug Hutton
*Assistant Examiner* — Ariel Mercado
(74) *Attorney, Agent, or Firm* — Yee & Associates, P.C.; David A. Mims, Jr.

(57) ABSTRACT

A method of assisting a user, for use in an environment comprising: a user session, an external entity session and a forms engine for generating a form. The method comprises the steps of: registering with the user session, wherein a first session is established between the user session and the forms engine; receiving a request for assistance from a user; in response to receiving the request, de-registering with the user session, wherein the first session is un-established; registering with the external entity session, wherein a second session is established between the external entity session and the forms engine; receiving input from the external entity session; and populating the form with the received input.

14 Claims, 6 Drawing Sheets

METHOD OF ASSISTING A USER

FIELD OF THE INVENTION

The present invention relates to a method of assisting a user.

BACKGROUND OF THE INVENTION

Communication media such as instant messaging, text messaging etc. have become more widespread. Several types of information and applications can be transported to users via these communication media (e.g. voting applications, marketing information etc.). One such application is an electronic form application, wherein a form (typically comprising a series of questions) is rendered to a user by means of a series of form prompts (e.g. textual, verbal etc.). A user populates the form with a series of inputs and once the user has completed populating the form, the user's data is submitted for further processing (e.g. storing the user's inputs in a database).

Current electronic form applications provide a degree of assistance information to the user. For example, for a date field in a form, the format of the required input can be displayed (e.g. DD/MM/YYYY). This information can be displayed in several ways. For example, the information can be displayed at the bottom of the form when the user moves a cursor over the date field in the form. In another example, the information can be displayed in a pop up window. In another example, the information is displayed as a list options, so that the user can select an appropriate option from the list.

Whilst current electronic form applications provide a certain amount of assistance information to a user, there will be situations when this assistance information is not sufficient. In these situations, the user will require a further amount of assistance in order to proceed with populating the form. For example, in a field of a form dedicated to a user's personnel information, namely a field relating to the user's manager's identification number, although assistance regarding the format of required input can be provided, assistance regarding the content of the input will not be able to be provided. This is because the content of the input is likely to change regularly and therefore maintenance of the assistance information will be time consuming.

Therefore, if the user does not know the input, they will have to resort to other means of obtaining the input, for example, telephoning their manager for the input, searching an online information source for the input, guessing at the input etc. However, these means have associated disadvantages. For example, the user may have to close the form in order to find the input, which may result in the user having to fill in the form from scratch when they restart the form. In another example, the user's manager may not be available to take the telephone call, in which case, completion of the form is delayed. In yet another example, searching an online information source for the input is time consuming and also delays completion of the form. In yet another example, a guess at the input will often be erroneous.

If completion of a form prompt requires a particular type of knowledge (i.e. expertise) because it is domain specific (e.g. a form prompt regarding car engines), the content of the input required will be even more time consuming to retrieve as the user may not know where to find it. Furthermore, having retrieved the input, the onus is on the user to have made sense of the input in order to complete the form correctly. If the user has misunderstood the input, then errors in populating the form will result.

One prior art solution to this problem comprises a screen sharing utility, which allows another party to share the user's screen so that the other party can provide input to the form on the user's behalf. However, this requires extra software at both the user's and other party's computer systems. Furthermore, the other party will be able to view the user's entire workspace, including the entire form and this obviously has an associated privacy issue.

There is a need for an improved form assistance mechanism.

SUMMARY OF THE INVENTION

According to a first aspect, the present invention provides a method of assisting a user, for use in an environment comprising: a user session, an external entity session and a forms engine for generating a form; the method comprising the steps of: registering with the user session, wherein a first session is established between the user session and the forms engine; receiving a request for assistance from a user; in response to receiving the request, de-registering with the user session, wherein the first session is un-established; registering with the external entity session, wherein a second session is established between the external entity session and the forms engine; receiving input from the external entity session; and populating the form with the received input.

Preferably, the request comprises a unique identifier associated with the external entity session. More preferably, the de-registering step further comprises the step of maintaining a pointer to the user session. Still more preferably, the method further comprises the step of: determining whether further input is to be received from the external entity session. In a preferred embodiment, the method further comprises the step of, in response to a negative determining step, re-registering with the user session, wherein the first session is re-established.

In one embodiment, the environment further comprises a broker and the external entity session is a subscriber session having an associated first piece of information and wherein the subscriber session is associated with the broker. In this embodiment, preferably, the form has an associated second piece of information. In this embodiment, the method further comprises the steps of: in response to receiving the request, retrieving, by the forms engine, the second piece of information; and communicating the second piece of information to the broker. In this embodiment, wherein the second piece of information represents at least one of: a topic associated with the form; a topic associated with a first form prompt associated with the form; and a topic associated with a second form prompt associated with the first form prompt. In this embodiment, the method preferably comprising the steps of: in response to receiving the second piece of information, comparing, by the broker, the second piece of information to the first piece of information; and determining whether the second piece of information matches the first piece of information. Preferably, the method further comprises the step of in response to a successful determination, registering with the subscriber session.

Preferably, the comparing step is performed according to a pre-defined counter value. Preferably, the first piece of information represents at least one of: a unique identifier associated with the form; and a unique identifier associated with a form prompt.

Suitably, the method further comprises the step of: determining, by the forms engine, according to a pre-defined time value, whether the user requires assistance. More suitably, the user session is associated with a unique identifier and wherein the populating the form step further comprises the step of: using the unique identifier in order to populate the form with the received input. Still more suitably, the user session is associated with a unique identifier and wherein the populating the form step further comprises the step of: using the unique identifier in order to populate the form with the received input and wherein the communicating step further comprises the step of: communicating the unique identifier associated with the user session to the broker. Still more suitably, the method further comprises the step of: in response to de-registering with the user session, disabling controls associated with the form.

According to a second aspect, the present invention provides a system for assisting a user, for use in an environment comprising: a user session, an external entity session and a forms engine for generating a form; the system comprising: means for registering with the user session, wherein a first session is established between the user session and the forms engine; means for receiving a request for assistance from a user; means, responsive to the receiving means, for de-registering with the user session, wherein the first session is un-established; means for registering with the external entity session, wherein a second session is established between the external entity session and the forms engine; means for receiving input from the external entity session; and means for populating the form with the received input.

According to a third aspect, the present invention provides a computer program comprising program code means adapted to perform any of the steps of the method as described above, when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
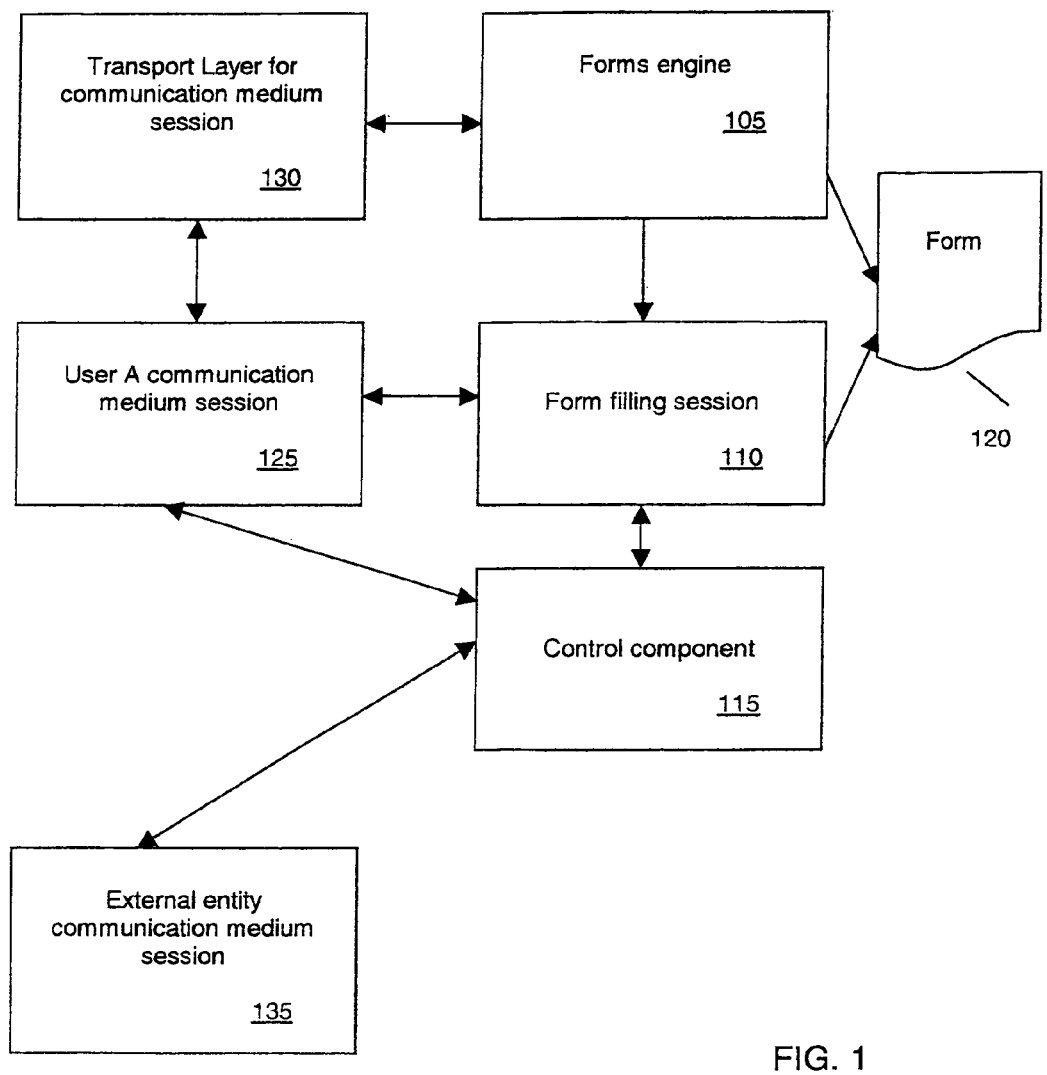
FIG. 1 is a block diagram of one embodiment of a system in which the present invention is implemented.

In a first embodiment, an overview of one system (100) in which the present invention may be implemented is shown in FIG. 1. The system (100) comprises a forms engine (105) which generates a form (120) and a form filling session (110). The form filling session (110) handles the rendering of the form (120). The form (120) is delivered to a user "A" via a communication medium (in this example, instant messaging). User "A" uses a user "A" communication medium session (125) (e.g. an instant messaging session). The system (100) also comprises a transport layer (130) for supporting communication medium sessions (e.g. a server hosting an instant messaging application) and an external entity communication medium session (135), which will be described in more detail below.

User "A" at the user "A" communication medium session (125) requests connection to the forms engine (105) via the transport layer (130). In response to receiving a request, the form engine (105) generates a form filling session (110). The system (100) also comprises a control component (115), which registers with a given user communication medium session that is connected to the form filling session (110). The control component (115) allows a user to have control of the form (120) for inputting and establishes a session between the user "A" communication medium session (125) and the forms engine (105). When an input is received from the user (e.g. a request, a response etc.), the forms engine (105) invokes a routine to handle the input.

Figure 2:
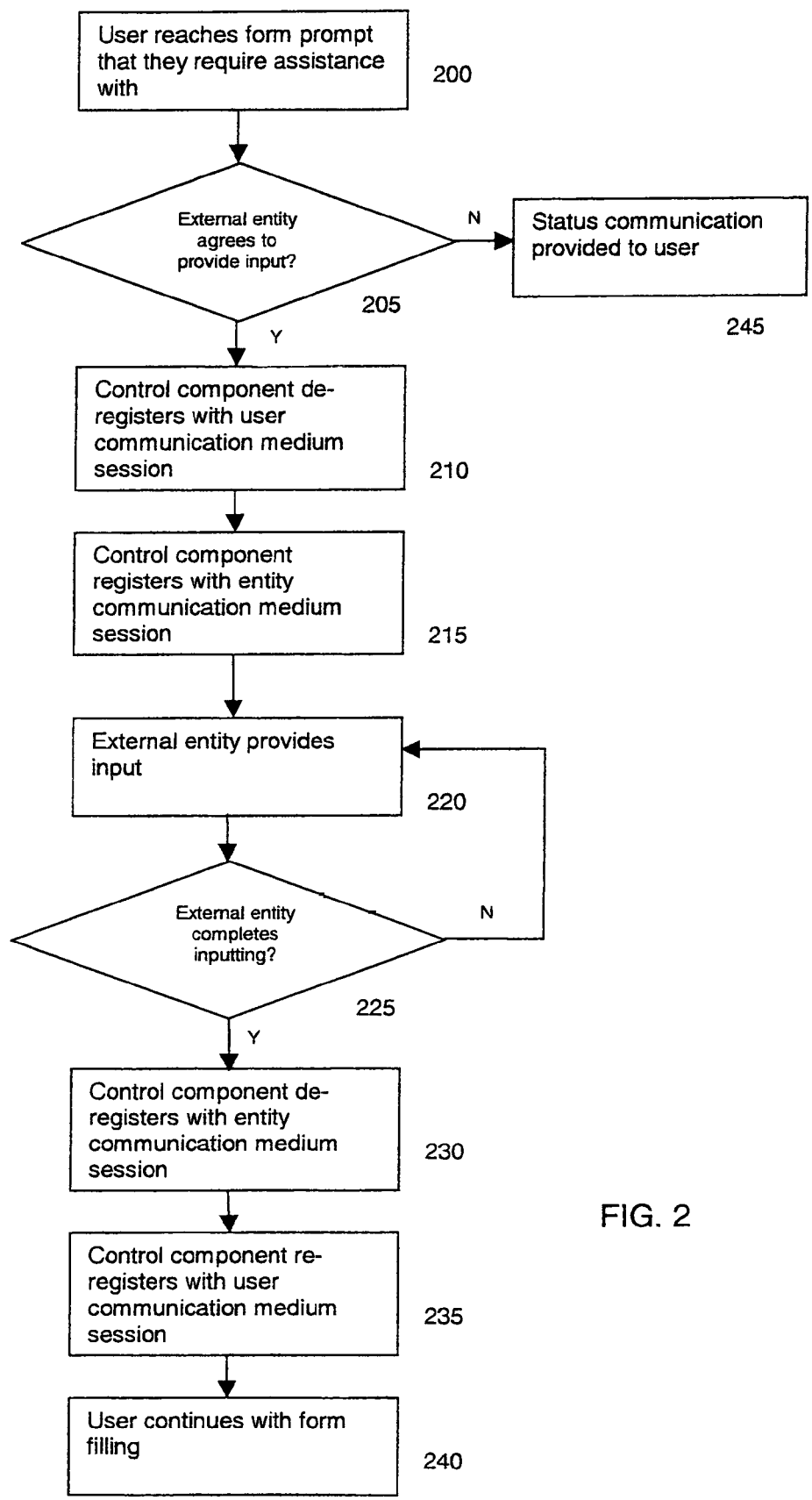
FIG. 2 is a flow chart showing the operational steps involved in a process of form filling, using the system of FIG. 1.

The process of the present invention will now be described with reference to FIG. 1 and FIG. 2. In a first example, user "A" connects to an expense claim form (120). A session is established between the user "A" communication medium session (125) and the form filling session (110). The control component (115) registers with the user "A" communication medium session (125). Next, form prompts from the form filling session (110) and responses from user "A" are exchanged:

Form session -> Please enter your forename:
User A -> John
Form session -> Please enter your surname:
User A -> Smith
Form session -> Please enter your manager's identification number:

In this example, user "A" does not know their manager's identification number and needs assistance for this particular form prompt (step 200). User "A" requests assistance, wherein the request is shown in quotes and is followed by a valid identifier associated with a target external entity. The entity (e.g. an individual, an expert system etc.) is external to the user "A" communication medium session (125). In this example, the external entity is the user's manager:

User A -> "ask" my_manager@company.com

In response to receiving the request, the forms engine (105) sends the following status communication to the external entity communication medium session (135):

Form session -> User A has requested some help in completing the following form prompt. Do you wish to assist? (yes/no)

If the external entity agrees to assist (positive result to step 205) (i.e. the external entity responds with "yes"), the control component (115) de-registers (step 210) with the user "A" communication medium session (125). The session is now de-established, however, the control component (115) maintains a pointer to the user "A" communication medium session (125), so that the control component (115) can re-register with the user "A" communication medium session (125) as will be described in more detail below. User "A" can now continue with other tasks.

Next, the control component (115) registers (step 215) with a communication medium session associated with the target external entity (in this case, external entity communication medium session (135)). A session is now established between the external entity medium session (135) and the forms engine (105). Next, the forms engine (105) sends the following status communication to the external entity communication medium session (135) via the form filling session (110):

Form session -> Please enter your manager's identification number:

Next, an input is received (step 220) from the external entity communication medium session (135):
Entity ->998877

In response to receiving the input, a determination (step 225) is made as to whether the external entity has completed providing input (for example, by prompting the external entity and receiving a response from the external entity). If it is determined that the external entity has not completed providing input (negative result to step 225), the external entity continues to provide input (step 220) (for example, in response to another form prompt). If it is determined that the external entity has completed providing input (positive result to step 225), the forms engine (105) sends a status communication to the external entity communication medium session (135):
Form session -> Thank you for your help. User A will now continue completing the form.

Following the status communication, the control component (115) de-registers (step 230) with the external entity communication medium session (135) and uses the pointer described above to re-register (step 235) with the user "A" communication medium session (125). The session between the user "A" communication medium session (125) and the forms engine (105) is now re-established.

Next, a status communication and further form prompts are sent to the user "A" communication medium session (125), so that user "A" can continue completing (step 240) the form:
Form session -> External entity has answered: 998877.
Form session -> Please enter your job title:

With reference to step 205, if the external entity declines to assist (i.e. the external entity responds with "no"), the following status communication and form prompt is sent (step 245) to the user "A" communication medium session (125):
Form session -> External entity declined to assist. Please try to answer the form prompt or ask another user. Alternatively respond with "exit" if you wish to exit from the form.
Form session -> Please enter your manager's identification number:

In this example, user "A" can either ask another external entity for assistance; can attempt to answer the form prompt; or can exit from the form (120).

In addition to passing control of a single prompt (i.e. via the request "ask"), a user can pass control of one or more prompts to an external entity. A second example will now be described, wherein the following exchanges ensue:
Form session -> The remainder of the form regards your manager's details
Form session -> Manager's name:
User A ->"delegate" to my_manager@company.com In this example, user "A" has passed control of one or more prompts to a target external entity (i.e. the user's manager) via the request "delegate" followed by a valid identifier associated with a target external entity. As described in steps 210 and 215, the control component (115) de-registers with the user "A" communication medium session (125) and registers with the external entity communication medium session (135). An example of the following exchanges is shown below:
Form session -> User A has delegated control of a form to you. Do you wish to assist? (yes/no)
Entity -> yes
Form session -> Manager' name:

In this example, the external entity can now complete the remainder of the form. Alternatively, the external entity can delegate control back to user "A" at any time, by sending a request followed by a valid identifier associated with user "A", as shown below:
Form session -> Employee address:
User B ->"return" to my_employee@company.com In response to receiving the request, the control component (115) de-registers with external entity communication medium session (135) and re-registers with the user "A" communication medium session (125). The following exchanges ensue with user "A":
Form session -> External entity has passed control of the form to you. Please try to answer the form prompt or ask another user. Alternatively respond with "exit" if you wish to exit from the form.
Form session -> Employee personnel number:

In both examples, once the form (120) has been completed (i.e. the required form prompts have been answered), the data associated with the form (120) (i.e. the responses to the form prompts) is processed (e.g. by a back-end system).

Figure 3:
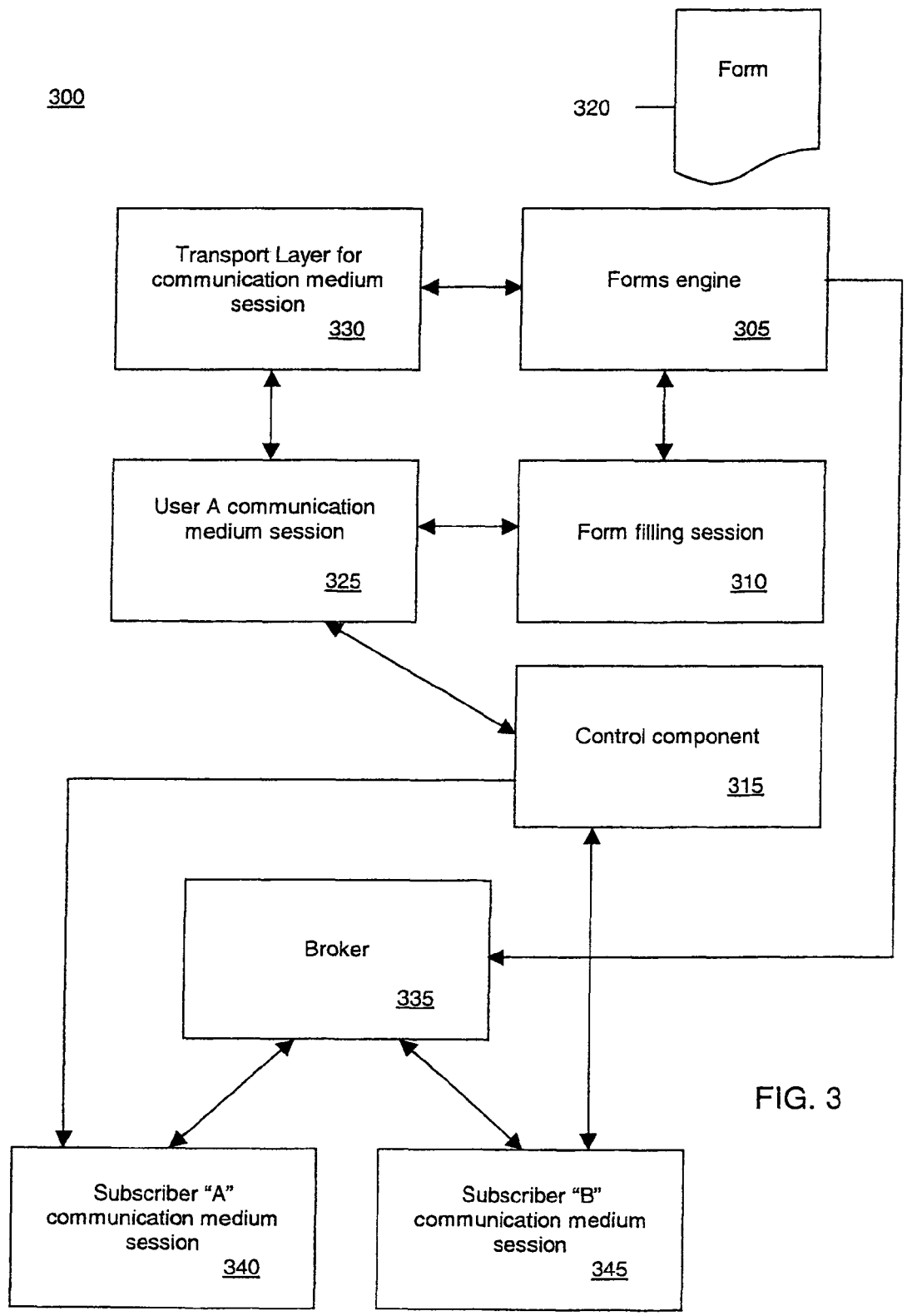
FIG. 3 is a block diagram of another embodiment of a system in which the present invention is implemented.

In a second embodiment, an overview of a system (300) in which the present invention may be implemented is shown in FIG. 3, the system (300) comprising a forms engine (305), a form filling session (310), a control component (315), a form (320), a user "A" communication medium session (325) and a transport layer (330), as described above. The system (300) also comprises a broker (335) having two associated subscriber communication medium sessions (340 and 345). Subscriber "A" and subscriber "B" use subscriber "A" communication medium session (340) and subscriber "B" communication medium session (345) respectively. In one example, a subscriber is an individual. In another example, a subscriber is a computer system comprising an expert system. In this embodiment, a subscriber is an individual. Each subscriber communicates a profile comprising information (e.g. information associated with their particular field of expertise, their skills, their qualifications etc.) to the broker (335).

Figure 4:
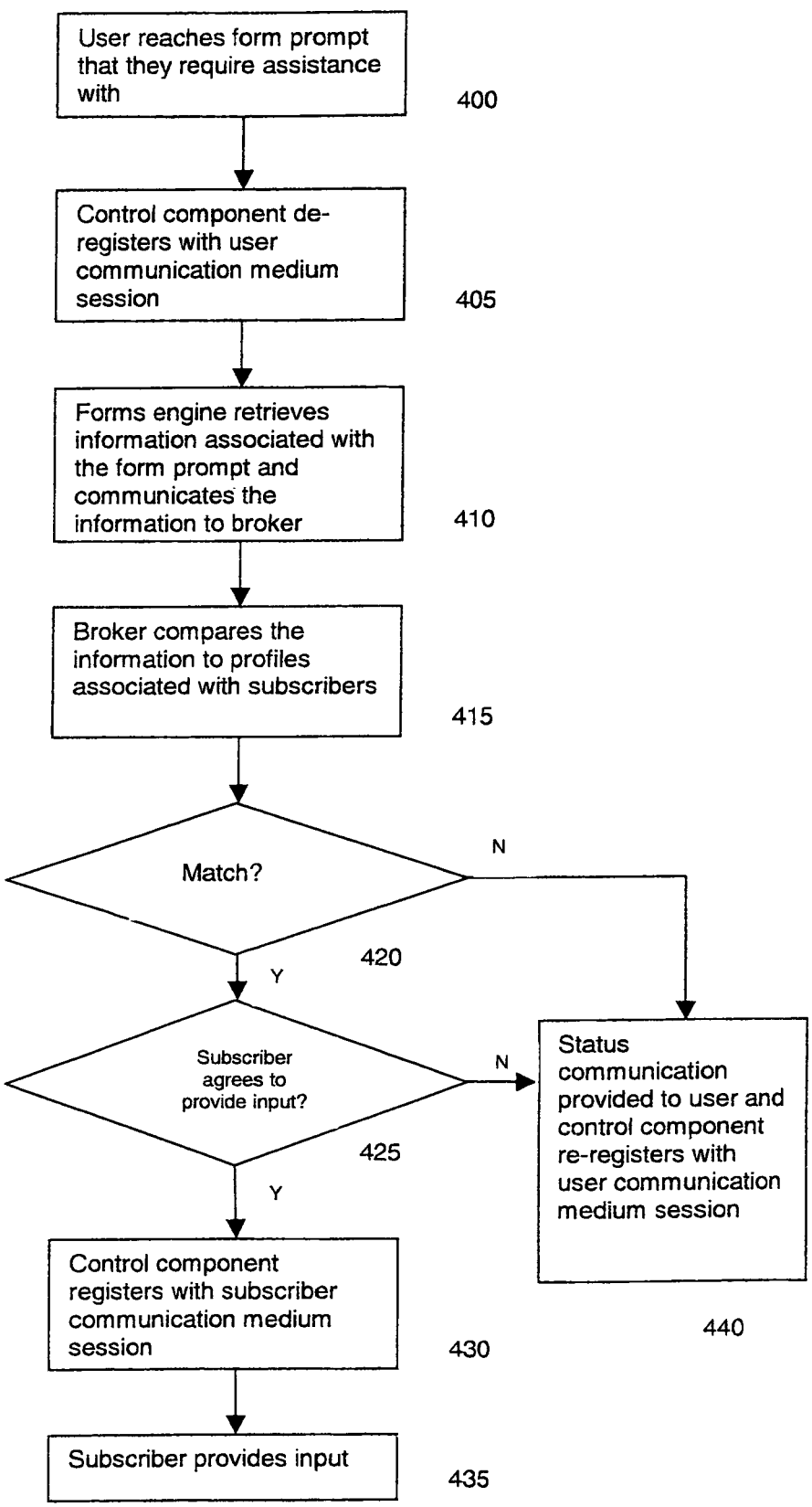
FIG. 4 is a flow chart showing the operational steps involved in a process of form filling, using the system of FIG. 3.

In this embodiment, one or more pieces of information are associated with each form prompt, wherein the one or more pieces of information represent context associated with the form prompt. The one or more pieces of information are associated with the form (320) and can be communicated to a broker (335) as will be described later. The process of the second embodiment will now be described with reference to FIG. 3 and FIG. 4.

After a form prompt is provided to user "A" at user "A" communication medium session (325), user "A" can request assistance (step 400). In response to receiving the request, the control component (315) de-registers (step 405) with the user "A" communication medium session (325). Next, the forms engine (305) retrieves (step 410) the one or more pieces of information associated with the form prompt and communicates the one or more pieces of information to the broker (335). Next, the broker (335) compares (step 415) the one or more pieces of information with the information in the profiles of its associated subscribers. If a match occurs (positive result to step 420) with at least one profile, the forms engine (305) communicates the form prompt to the subscriber(s) associated with the at least one matching profile via the broker (335) and a determination is made as to whether or not the subscriber is to assist (step 425).

If the subscriber agrees to assist (positive result to step 425), the control component (315) registers (step 430) with the associated subscriber communication medium session, so that the subscriber can provide input (step 435). If the subscriber does not agree to assist (negative result to step 425), a status communication informing the user of this is sent (step 440) and the control component (315) re-registers with the user "A" communication medium session (325).

Referring to step 420, if a match does not occur (negative result to step 420), a status communication informing the user of this is sent (step 440) and the control component (315) re-registers with the user "A" communication medium session (325).

An example will now be described, wherein a user connects to a form (320) relating to ordering spare parts for a car. A session is established between the user "A" communication medium session (325) and the form filling session (310). The control component (315) maintains an interest in the user "A" communication medium session (325). The following exchanges now ensue:

Form session -> Please enter the make and model of your car
User -> Volkswagen Golf 1.6 CL
Form session -> Please enter the number of valves in your Volkswagen Golf engine, by entering the number which matches your selection
Form session ->1) 8v
Form session ->2) 16v
Form session ->3) 20v In this example, user "A" is looking for a headlamp but is now faced with a mandatory question that they do not know how to answer (step 400). If a response is not received from user "A" (for example, after a pre-determined time period), the forms engine (305) invokes a form prompt that asks the user if they require assistance. This form prompt is provided to the user via the form filling session (310):

Form session -> Do you require assistance with the completion of this form (yes/no)?

If the user responds with "no", the forms engine (305) waits for a response until the pre-determined time period has expired again, after which, the user can be prompted again. Alternatively, the user has the option of exiting from the form (320).

If the user responds with "yes", the control component (315) de-registers (step 405) with the user "A" communication medium session (325) and the forms engine (305) retrieves (step 410) the one or more pieces of information associated with the form prompt. An example of the one or more pieces of information for the form prompt, highlighted in bold, is shown below:

<formprompt>Number_of_valves
<information1>Technical; Cars</information1>
<information2>Volkswagen Golf engine</information2>
<additional-information>make_model</additional-informatio n>
</formprompt>

The piece of information "information1" represents a general topic of the form (and also the general topic that a subscriber would subscribe to). Examples of other general topics are "Languages; European"; "Sports; Yoga" etc. The piece of information "information2" represents the context associated with a form prompt (i.e. the topic of the form prompt). In one embodiment, a subscriber specifies one or more topics of form prompts in their profile. The piece of information "additional-information" represents information associated with at least one form prompt related to the form prompt that the user has asked assistance for.

The pieces of information are communicated to the broker (335). "Information1" (and in another embodiment, "information2" as well) is compared by the broker (335) (step 415) with the profiles of its associated subscribers and if a match occurs (positive result to step 420) with at least one profile, the forms engine (305) communicates the form prompt to the subscriber associated with the at least one matching profile via the broker (335).

Next a determination is made as to whether or not the subscriber is to assist (step 425). In this example, the following status communication and form prompt is sent to the subscriber:

Form session -> User "A" requires assistance in filling in a form prompt
Form session -> Do you wish to assist? (yes/no)

If the subscriber does not accept the request for assistance (i.e. the subscriber responds "no") (negative result to step 425), control of the form is passed back to the user when the control component (315) re-registers (step 440) with the user "A" communication medium session (325).

If the subscriber agrees to assist (i.e. the subscriber responds "yes") (positive result to step 425), the control component (315) registers (step 430) with the subscriber communication medium session, so that the subscriber can provide input (step 435) to the form prompt. The pieces of information "Information2" and "additional-information" are now sent to the subscriber:

Form session -> The form prompt relates to the keywords "Volkswagen Golf engine".
Form session -> The form prompt is:
Please enter the number of valves in your Volkswagen Golf engine, by entering the number which matches your selection
1) 8v
2) 16v
3) 20v
Form session -> For your information, user "A" has previously entered "Golf 1.6 CL" when prompted for the make and model of their car.

Once the subscriber has provided input, in one example control of the form can be passed to the user. In another example, the subscriber can continue to fill in the form.

In yet another example, the forms engine (305) retrieves one or more pieces of information associated with the next form prompt. The pieces of information are communicated to the broker (335) and "information1" is compared with the profile of the subscriber. If a match occurs, the forms engine (305) invokes a form prompt that requests further assistance from the subscriber:

Form session -> The next form prompt also relates to your area of expertise:
Form session -> Please enter the engine type of your car, by entering the number which matches your selection:
Form session ->1) OHC
Form session ->2) DOHC
Form session -> Do you wish to answer this form prompt? (yes/no)

If the subscriber agrees to assist, the control component (315) maintains registration with the subscriber communication medium session, so that the subscriber can provide input to the form prompt. Optionally, this process continues until the subscriber reaches a form prompt having associated information that does not match information in their profile. In this case, in one example, control of the form is passed back to the user. In another example, the information associated with the form prompt is passed to the broker (335), which compares "information1" with the profiles of its associated subscribers, in order to find a subscriber that can assist.

Optionally, a counter having a pre-configured value is associated with the information of a form prompt. Each time the information of a form prompt is used by the broker (335) in the comparison process, the counter is incremented and the comparison process is repeated until the counter has been incremented by the pre-configured value. Once the value has been met or exceeded, the user can attempt to answer the form prompt again, or can exit from the form.

Figure 5:
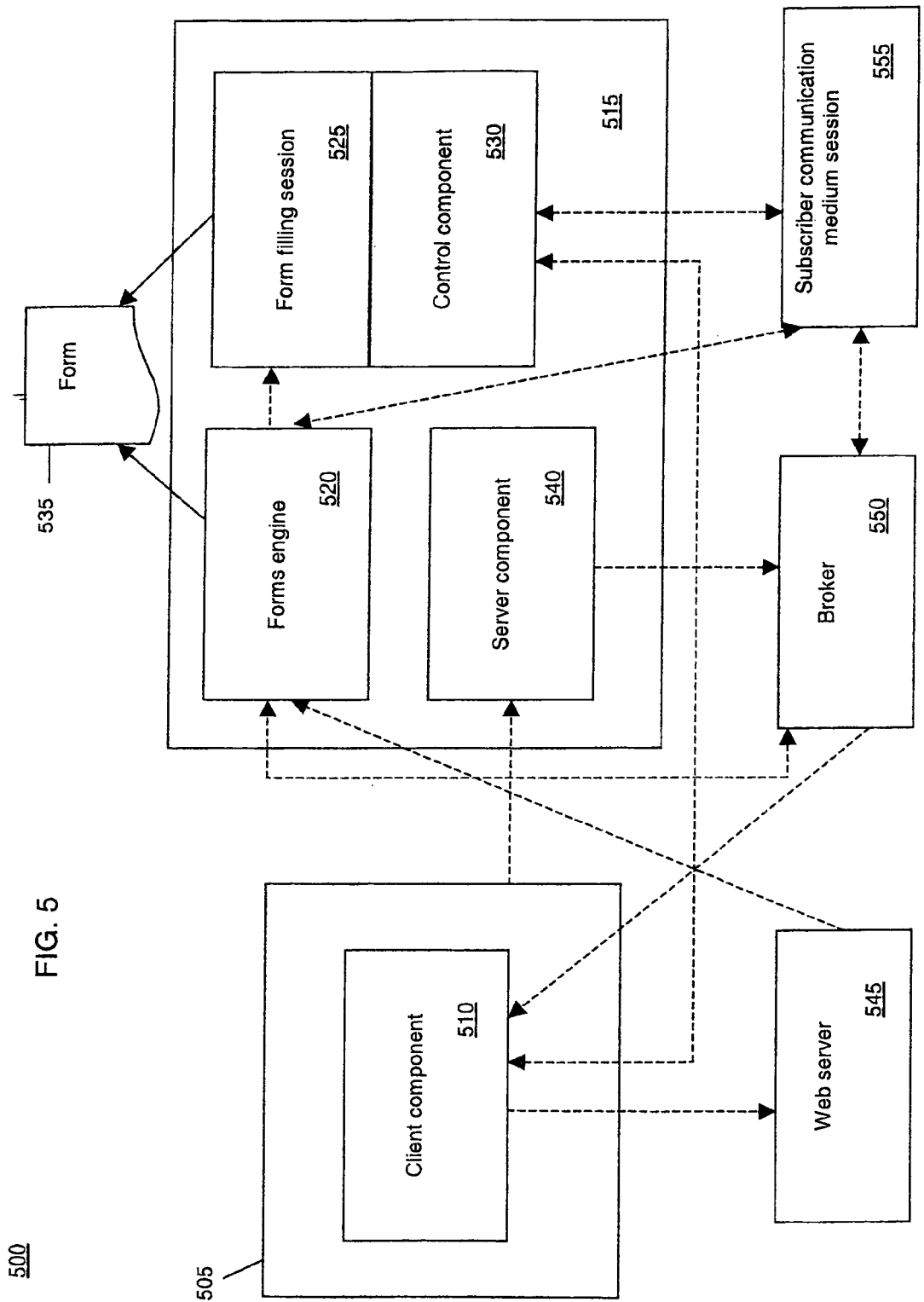
FIG. 5 is a block diagram of yet another embodiment of a system in which the present invention is implemented.

In a third embodiment, an overview of a system (500) in which the present invention may be implemented is shown in FIG. 5. The system (500) comprises a client web browser application (505) having a client component (510) and an application server (515) having a forms engine (520), a form filling session (525), a control component (530), an associated form (535) and a server component (540). The system (500) also comprises a web server (545), a broker (550) and a subscriber communication medium session (555). A subscriber at the subscriber communication medium session (555) communicates a profile to the broker (550), wherein the profile comprises information associated with: a unique identifier associated with a form that they can assist with. In another embodiment, the profile also comprises information associated with: a unique identifier associated with at least one form prompt that they can assist with.

In this embodiment, the web browser application (505) represents a user communication medium session. When a user wishes to fill in a form (535), the user connects to a web server (545) to connect to a web page that displays the form. The forms engine (520) communicates the form (535) via the form filling session (525) to the web server (545). As in the second embodiment, when a user requests assistance for a form prompt, the broker (550) is invoked in order find a subscriber (e.g. a subscriber at subscriber communication medium session (555)) that can assist the user.

In more detail, when a user requests assistance (e.g. by clicking on a hyperlink) for a first form prompt, the web browser application (505) invokes a function comprising one or more parameters. In this example, the parameters are: a unique identifier associated with the form, a unique identifier associated with the first form prompt and a unique identifier associated with a second form prompt that is related to the first form prompt.

Figure 6:
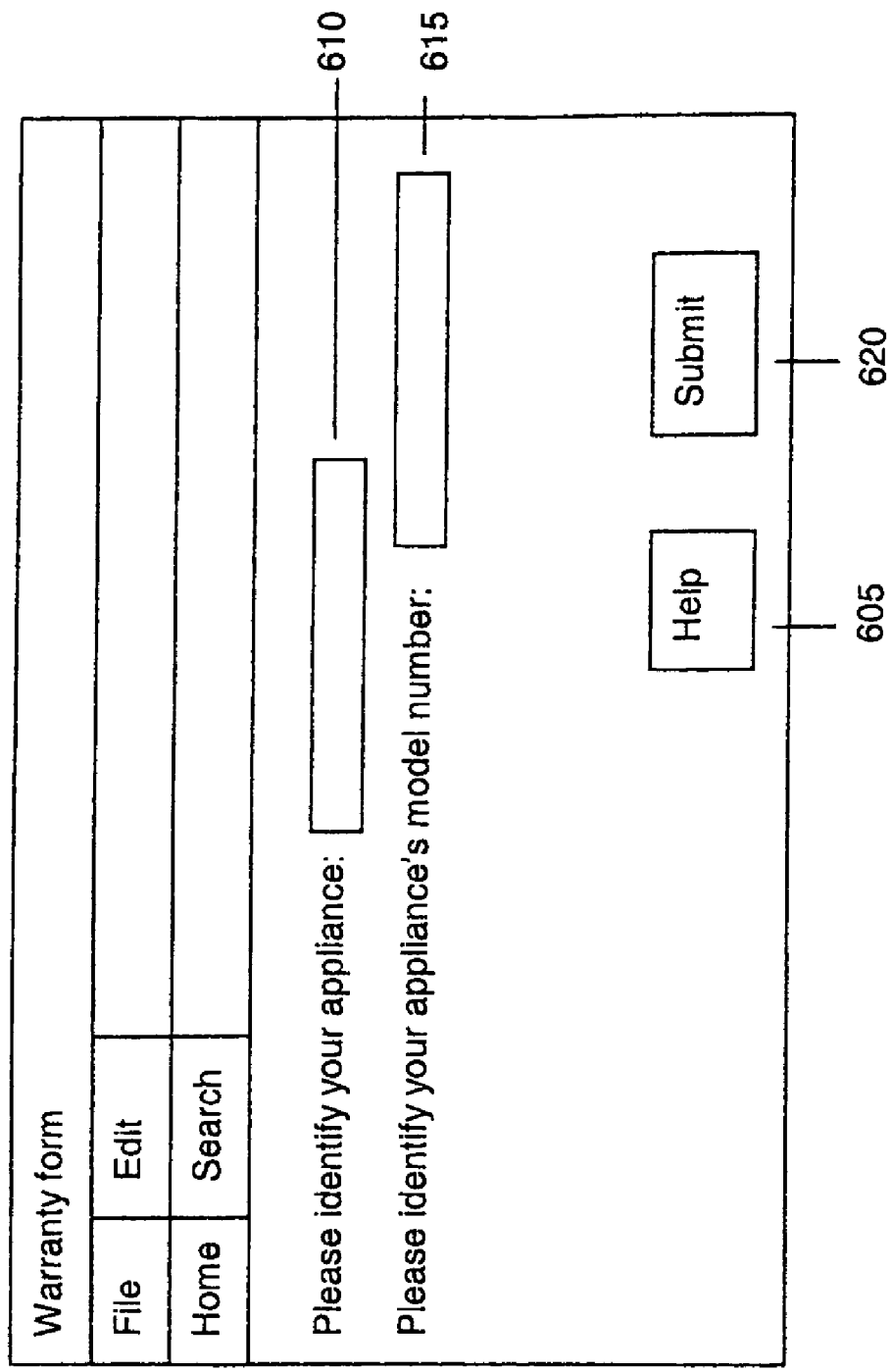
FIG. 6 is a diagram showing an example of a form prompt used in the system of FIG. 5.

With reference to FIG. 6, the form (600) is related to warranty information for a household appliance and its unique identifier is "warrantyform", the first form prompt is related to the model number of the household appliance and its unique identifier is "modelnumber" and the second form prompt is related to the identity of the household appliance and its unique identifier is "appliancename". When the user requests assistance (e.g. by clicking on a "help" icon (605)), the following function is invoked:
summonHelp("warrantyform", "modelnumber", appliancename")

The function is then communicated to the server component (540), for example, via a URL (i.e. a Uniform Resource Locator). Optionally, a unique identifier that identifies the user's web browser application (505) is also communicated. Optionally, controls associated with the form prompts (i.e. fields (610, 615), a submit button (620) for submitting the form) are now disabled, so that the user cannot populate the form. Advantageously, this prevents conflict with input from the subscriber.

When the server component (540) receives the function, it sends the parameters to the broker (550), which uses the parameters to search profiles associated with its subscribers. If a match is found and if the subscriber agrees to assist, the control component (530) uses the register and de-register mechanism described above so that the subscriber can provide input. An example of the following exchanges is shown below:
Form session -> User requires assistance in responding to the following form prompt: "Please identify the appliance's model number"

Form session -> For your information, for the form prompt "Please identify your appliance" the user has previously entered "Bloggs 200 Fridge"

Form session -> Please identify the appliance's model number

Once the subscriber has provided input, the input is communicated back to client component (510) on the web browser application (505), via the forms engine (520) and then via the broker (550). Optionally, the unique identifier that identifies the user's web browser application is used in the communication. The client component (510) populates the form (535) with the input and the form fields (610, 615) and submit button (620) are re-enabled, to allow the user to continue with populating the form.

In one embodiment, a validation component validates a responses received from an external entity. In another embodiment, a plurality of responses is received from an external entity and is presented to the user as a list of options. A user then selects an option and the selected option is then placed in the form.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

The invention claimed is:

1. A method of assisting a user, for use in an environment comprising: a user session, an external entity session and a forms engine for generating a form; the method comprising computer-implemented steps of:
registering a control component with the user session, wherein a first session is established between the user session and the forms engine;
receiving a request for assistance from the user, wherein the request for assistance is with respect to particular information that the forms engine is requesting from the user session;
in response to receiving the request, de-registering the control component with the user session, wherein the first session is un-established;
registering the control component with the external entity session, wherein a second session is established between the external entity session and the forms engine;
receiving input from the external entity session;
populating the form with the received input;

wherein the environment further comprises a broker data processing system and the external entity session is a subscriber session and wherein the subscriber session is associated with the broker, and wherein the broker maintains a plurality of profiles for different subscribers that are each operable to provide assistance to the user, and one of the plurality of profiles comprises a first piece of information;

wherein the form has an associated second piece of information;

in response to receiving the request, retrieving, by the forms engine, the second piece of information;

communicating the second piece of information to the broker;

in response to receiving the second piece of information, comparing, by the broker, the second piece of information to the first piece of information in the one of the plurality of profiles to determine whether the second piece of information matches the first piece of information; and in response to a successful determination that the second piece of information matches the first piece of information, registering a subscriber that is associated with the one of the plurality of profiles with the subscriber session, wherein the different subscribers are individuals and the subscriber is one of the individuals, and wherein after being registered the subscriber is presented with an additional piece of information previously provided by the user in the user session.

2. A method as claimed in claim 1, wherein the request comprises a unique identifier associated with the external entity session, the unique identifier being specified by the user in the request for assistance.

3. A method as claimed in claim 2, wherein the user session is associated with a unique identifier and wherein the populating the form step further comprises the step of:
using the unique identifier in order to populate the form with the received input.

4. A method as claimed in claim 1, wherein the de-registering step further comprises the step of maintaining a pointer to the user session that the control component is de-registered with.

5. A method as claimed in claim 1, further comprising the step of:
in response to populating the form with the received input, determining whether further input is to be received from the external entity session.

6. A method as claimed in claim 5, further comprising the step of:
in response to a negative determining step, re-registering the control component with the user session, wherein the first session is re-established.

7. A method as claimed in claim 1, wherein the second piece of information represents at least one of: a topic associated with the form, a topic associated with a first form prompt associated with the form, and a topic associated with a second form prompt associated with the first form prompt.

8. A method as claimed in claim 1, wherein the comparing step is performed according to a pre-defined counter value.

9. A method as claimed in claim 1, wherein the first piece of information represents at least one of:
a unique identifier associated with the form, and a unique identifier associated with a form prompt.

10. A method as claimed in claim 1, further comprising the step of:
determining, by the forms engine, according to a pre-defined time value, whether the user requires assistance.

11. A method as claimed in claim 1, wherein the user session is associated with a unique identifier and wherein the populating the form step further comprises the step of:
using the unique identifier in order to populate the form with the received input and wherein the communicating step further comprises the step of:
communicating the unique identifier associated with the user session to the broker.

12. A method as claimed in claim 1, further comprising the step of:
in response to de-registering with the user session, disabling controls associated with the form.

13. A data processing system including a memory for assisting a user, for use in an environment comprising:
a user session, an external entity session and a forms engine for generating a form;
the data processing system apparatus comprising: means for registering a control component with the user session, wherein a first session is established between the user session and the forms engine;
means for receiving a request for assistance from the user;
means, responsive to the receiving means, for de-registering the control component with the user session, wherein the first session is un-established;
means for registering the control component with the external entity session, wherein a second session is established between the external entity session and the forms engine;
means for receiving input from the external entity session;
means for populating the form with the received input;
wherein the environment further comprises a broker data processing system and the external entity session is a subscriber session and wherein the subscriber session is associated with the broker, and wherein the broker maintains a plurality of profiles for different subscribers that are each operable to provide assistance to the user, and one of the plurality of profiles comprises a first piece of information;
wherein the form has an associated second piece of information;
means, in response to receiving the request, for retrieving, by the forms engine, the second piece of information;
means for communicating the second piece of information to the broker;
means, in response to receiving the second piece of information, for comparing, by the broker, the second piece of information to the first piece of information in the one of the plurality of profiles to determine whether the second piece of information matches the first piece of information; and
means, in response to a successful determination that the second piece of information matches the first piece of information, for registering a subscriber that is associated with the one of the plurality of profiles with the subscriber session.

14. A non-transitory computer readable tangible storage medium encoded with a computer program comprising program code means adapted to perform the steps of claim 1, when said program is run on a computer.

* * * * *